(12) United States Patent
Wu et al.

(10) Patent No.: US 11,598,554 B2
(45) Date of Patent: Mar. 7, 2023

(54) FILTER FIXING DEVICE AND AIR CONDITIONING UNIT USING THE SAME

(71) Applicants: York Guangzhou Air Conditioning and Refrigeration Co., Ltd., Qingyuan (CN); Johnson Controls Technology Company, Auburn Hills, MI (US)

(72) Inventors: Jinqiang Wu, Qingyuan (CN); Zuowei Zhong, Guangzhou (CN); Yunhong Huang, Meizhou (CN); Aihua Tan, Guangzhou (CN)

(73) Assignees: York Guangzhou Air Conditioning and Refrigeration Co., Ltd., Quingyuan (CN); Johnson Controls Tyco IP Holdings LLP, Milwaukee, WI (US)

( * ) Notice: Subject to any disclaimer, the term of this patent is extended or adjusted under 35 U.S.C. 154(b) by 105 days.

(21) Appl. No.: 17/175,348

(22) Filed: Feb. 12, 2021

(65) Prior Publication Data

US 2021/0262695 A1 Aug. 26, 2021

(30) Foreign Application Priority Data

Feb. 14, 2020 (CN) .......................... 202010092409.6

(51) Int. Cl.
*F24F 13/28* (2006.01)
*B01D 46/00* (2022.01)

(52) U.S. Cl.
CPC .......... *F24F 13/28* (2013.01); *B01D 46/0006* (2013.01); *B01D 2265/024* (2013.01); *B01D 2265/028* (2013.01)

(58) Field of Classification Search
CPC ............... F24F 13/28; B01D 2265/024; B01D 2265/028; B01D 46/0006
See application file for complete search history.

(56) References Cited

U.S. PATENT DOCUMENTS 4,217,122 A * 8/1980 Shuler ................ B01D 46/4227
55/504
4,767,427 A * 8/1988 Barabas ............. B01D 46/2411
55/508

(Continued)

FOREIGN PATENT DOCUMENTS

CN 101797729 A 8/2010
CN 204718081 U 10/2015

(Continued)

*Primary Examiner* — Robert Clemente
(74) *Attorney, Agent, or Firm* — Fletcher Yoder, P.C.

(57) ABSTRACT

The present application provides a filter fixing device, comprising: a lock mounting piece, a hold-down piece, a push rod and at least one connecting rod. The lock mounting piece is provided with a lock used for engaging the lock receiving part on the filter fixing frame; the hold-down piece and the lock mounting piece are connected to each other in such a way that they can move relative to each other in a first direction, and the hold-down piece is used to hold down the filter; the push rod is connected to the hold-down piece and can pivotally rotate around an axis; at least one connecting rod is pivotally connected to the push rod and the lock mounting piece; the filter fixing device is configured in such a way that the rotation of the push rod relative to the hold-down piece may cause relative motion of the hold-down piece and the lock mounting piece in the first direction. The filter fixing device provided by the present application has a simple structure, is easy to operate, and can firmly hold the filter so that it is possible to easily replace the filter while meeting the requirement on the filtering performance of the air conditioning unit.

10 Claims, 8 Drawing Sheets

(56) References Cited

U.S. PATENT DOCUMENTS

| | | | | |
|---|---|---|---|---|
| 8,105,409 B2* | 1/2012 | Mann | ............... | B01D 46/58 55/501 |
| 2010/0192528 A1* | 8/2010 | Mann | ............... | B01D 46/58 55/482 |
| 2010/0229514 A1* | 9/2010 | Ayshford | ......... | B01D 46/0005 55/482 |
| 2010/0251678 A1* | 10/2010 | Mann | ............... | B01D 46/121 55/483 |
| 2012/0060454 A1 | 3/2012 | Banks et al. | | |
| 2012/0204523 A1* | 8/2012 | Woolard | ............ | B01D 46/10 55/357 |
| 2021/0162323 A1* | 6/2021 | Hjertqvist | ......... | B01D 46/10 |

FOREIGN PATENT DOCUMENTS

| | | |
|---|---|---|
| CN | 105731317 A | 7/2016 |
| CN | 105926932 A | 9/2016 |
| CN | 109569069 A | 4/2019 |
| CN | 208737056 U | 4/2019 |
| CN | 208984447 U | 6/2019 |
| WO | 2020020854 A1 | 1/2020 |

\* cited by examiner

FILTER FIXING DEVICE AND AIR CONDITIONING UNIT USING THE SAME

CROSS-REFERENCE TO RELATED APPLICATIONS

This application claims priority to and the benefit of Chinese Patent Application No. 202010092409.6, filed Feb. 14, 2020, which is herein incorporated by reference in its entirety for all purposes.

TECHNICAL FIELD

The present application relates to the field of machinery of air conditioning units, and in particular to a filter fixing device and a filter fixing structure of air conditioning units.

BACKGROUND ART

The filter of an air conditioning unit needs to be removed and replaced frequently to maintain air cleanliness and the cooling effect of the air conditioning unit. Existing filter fixing devices with a simple structure have insufficient holding force, and it is difficult to meet the filtering performance requirement of air conditioning units; while the existing filter fixing device with strong holding force is inconvenient to operate, and filter replacement is very time-consuming.

SUMMARY OF THE INVENTION

At least one objective of the present application in the first aspect is to provide a filter fixing device which has a strong holding force and is easy to remove. The filter fixing device comprises: a lock mounting piece, provided with a lock used for engaging the lock receiving part on the filter fixing frame; a hold-down piece, wherein the hold-down piece and the lock mounting piece are connected to each other in such a way that they can move relative to each other in a first direction, and the hold-down piece is used to hold down the filter; a push rod, connected to the hold-down piece and which can pivotally rotate around an axis; and at least one connecting rod, wherein the at least one connecting rod is pivotally connected to the push rod and the lock mounting piece; wherein the filter fixing device is configured in such a way that the rotation of the push rod relative to the hold-down piece may cause relative motion of the hold-down piece and the lock mounting piece in the first direction.

According to the above-mentioned first aspect, the lock mounting piece comprises a connecting part for the hold-down piece, wherein the connecting part for the hold-down piece is provided with a sliding slot positioned along the first direction, the hold-down piece is provided with a sliding block positioned along the first direction, and the lock mounting piece and the hold-down piece can move relative to each other through the sliding slot and the sliding block.

According to the above-mentioned first aspect, the lock mounting piece comprises a connecting part for the connecting rod, wherein the connecting part for the connecting rod is positioned along a second direction and fixedly connected to the connecting part for the hold-down piece, and the connecting rod is pivotally connected to the connecting part for the connecting rod, wherein the second direction intersects with the first direction.

According to the above-mentioned first aspect, the connecting part for the connecting rod comprises a push rod receiving part and a push rod limiting part, wherein the push rod receiving part is used to receive the push rod and the push rod limiting part is used to limit the rotation of the push rod relative to the hold-down piece.

According to the above-mentioned first aspect, the connection point between the at least one connecting rod and the connecting part of the connecting rod is a first connection point of the connecting rod, which is spaced at a certain distance from the connecting part for the hold-down piece; the connection point between the at least one connecting rod and the push rod is a second connection point of the connecting rod, which is spaced at a certain distance from the first connection point in the first direction and from the axis.

According to the above-mentioned first aspect, the hold-down piece comprises a hold-down part, wherein the hold-down part is positioned perpendicular to the first direction, the hold-down part is fixedly connected to the sliding block, and the push rod is pivotally connected to the hold-down part.

According to the above-mentioned first aspect, two connecting rods are provided as the at least one connecting rod, wherein the two connecting rod are symmetrically connected to the two sides of the push rod.

At least one objective of the present application in the second aspect is to provide a filter fixing structure. The filter fixing structure comprises: the filter fixing device according to the above-mentioned first aspect; and a filter fixing frame, wherein the filter fixing frame is provided with a lock receiving part, the lock receiving part can be connected to or separated from the lock of the filter fixing device to detachably fix the filter in the filter fixing frame.

According to the above-mentioned second aspect, the lock and the lock receiving part are both lock hooks.

At least one objective of the present application in the third aspect is to provide an air conditioning unit. The air conditioning unit comprises: the filter fixing structure according to the above-mentioned second aspect; and a filter; wherein the filter can be pressed in the filter fixing frame by the hold-down piece of the filter fixing device, so as to be detachably fixed by the filter fixing device in the filter fixing frame.

The filter fixing device provided by the present application has a simple structure, is easy to operate, and can firmly hold the filter such that it is possible to easily replace the filter while meeting the requirement on the filtering performance of the air conditioning unit.

DETAILED DESCRIPTION OF THE EMBODIMENTS

Various specific embodiments of the present application will be described below with reference to the drawings which form a part of this specification. It should be understood that although the terms referring to directions, such as "front", "back", "upper", "lower", "left", "right", etc., are used in this application to describe various example structural parts and elements of the present application, these terms are used herein for convenience of description only, determined on the basis of the example orientations shown in the figures. Since the embodiments disclosed in the present application may be configured in different directions, these terms referring to directions are used only for description but may not be deemed as limitations.

Figure 1:
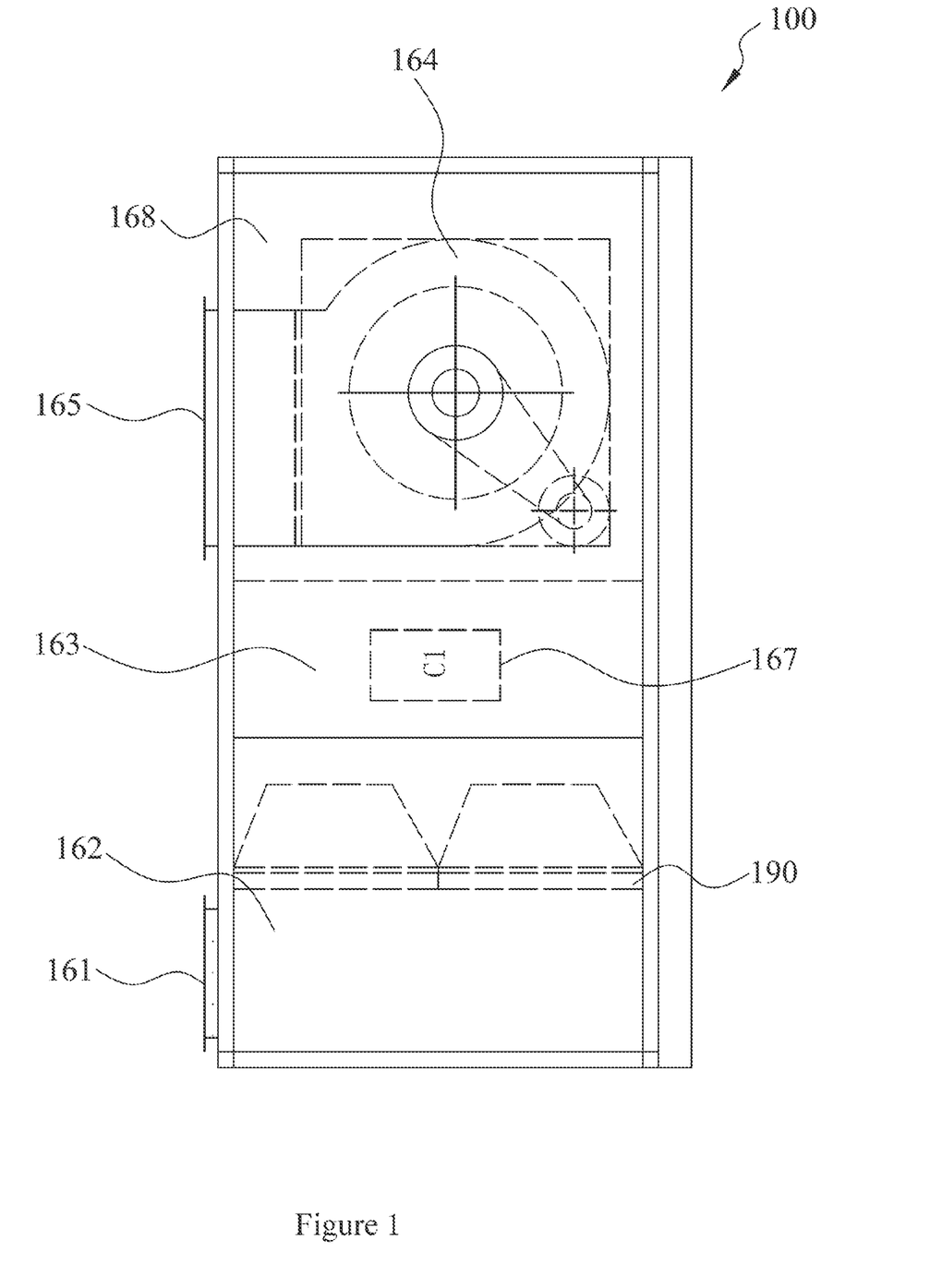
FIG. 1 illustrates one embodiment of the air conditioning unit 100 according to the present application.

FIG. 1 illustrates one embodiment of the air conditioning unit 100 according to the present application and is intended to show the overall structure of the air conditioning unit 100. As shown in FIG. 1, the air conditioning unit 100 comprises in proper order a filter section 162, a coil section 163 and a fan section 168, wherein the filter section 162 is connected to the air inlet 161 of the air conditioning unit 100, the fan section 168 is connected to the air outlet 165 of the air conditioning unit 100, and the coil section 163 is positioned between the filter section 162 and the fan section 168. In the present embodiment, the filter section 162 is provided with a filter 190, used to filter the air coming into the air conditioning unit 100 from the air inlet 161, wherein the air inlet 161 is connected to the air inlet side of the filter 190. A refrigeration system 167 is provided in the coil section 163, and the refrigeration system 167 can generate heat or cold. A fan 164 is provided in the fan section 168, and the fan 164 is used to facilitate air flow along the expected path, wherein an air outlet 165 is connected to the air outlet side of the fan 164.

Under the effect of the fan 164, untreated air enters the air conditioning unit 100 from the air inlet 161, flows sequentially through the filter section 162, coil section 163 and the fan section 168, and is finally discharged from the air conditioning unit 100 through the air outlet 165. Specifically, untreated air firstly flows through the filter 190 in the filter section 162 for filtering, exchanges heat with the refrigeration system 167 in the coil section 163 to be heated or cooled by the refrigeration system 167, then flows through the fan 164 of the fan section 168, and finally exits the air conditioning unit 100 from the air outlet 165. In this way, the air conditioning unit 100 can filter and purify the air and can regulate the air temperature.

In this embodiment, the filter section 162 is positioned near the air inlet 161. Optionally, the filter section 162 may also be positioned near the air outlet 165 or at another point between the air inlet 161 and the air outlet 165. In addition, several filtering sections 162 may be provided in the air conditioning unit 100 to improve the filtering result in order to meet the requirement on the filtering performance.

Figure 2:
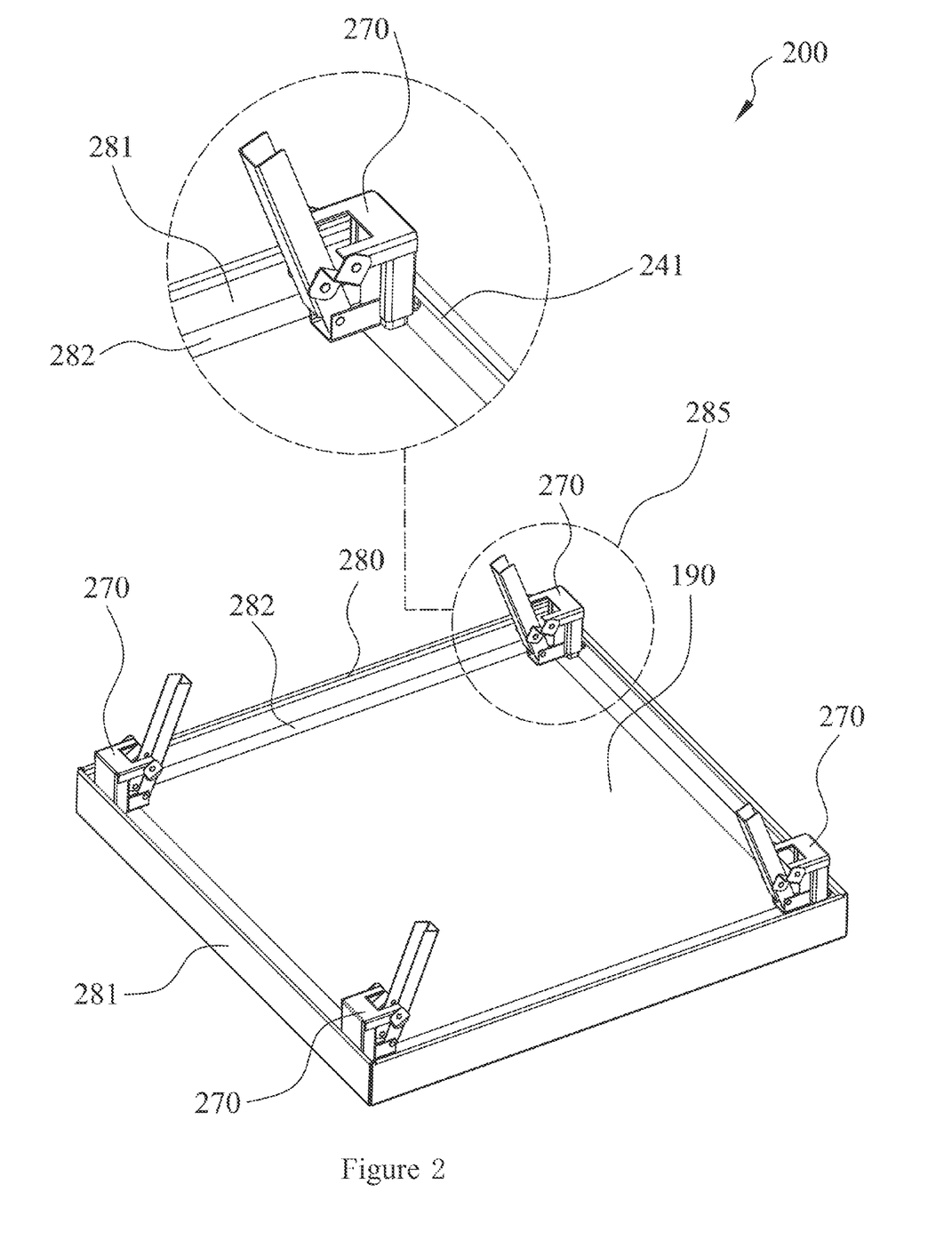
FIG. 2 is a perspective view of one embodiment of the filter fixing structure 200 according to the present application.

FIG. 2 is a perspective view of one embodiment of the filter fixing structure 200 according to the present application. The filter fixing structure 200 is used to connect the filter 190 in the filter section 162. The dashed box 285 in the figure is a detail view. As shown in FIG. 2, the filter fixing structure 200 comprises a filter fixing frame 280 and four filter fixing devices 270, wherein the filter fixing frame 280 is fixed in the filter section 162, and the filter 190 (not shown in FIG. 2) is fixed on the filter fixing frame 280 by the filter fixing devices 270.

Specifically, the filter fixing frame 280 is in a shape similar to a square and comprises four side frames 281, which are connected in sequence to form the filter fixing frame 280. Each side frame 281 extends inward from the bottom to form support plates 282. Each support plate 282 is used to support the edge of the filter 190 so as to carry the filter 190 on the filter fixing frame 280, and the support plates 282 do not block the air flow that passes through the filter 190. Each side frame 281 is provided with a lock receiving part 241. The lock receiving part 241 is used to engage or disengage the lock 305 of the filter fixing device 270 (refer to the lock hooks 305 in FIGS. 3A and 3B). As a specific embodiment, the lock receiving part 241 is a lock hook 241 formed on each side frame 281 by extending from the top to the bottom. The lock hook 241 and the lock hook 305 can be hooked to each other to limit the upward movement of the lock mounting piece 303, thereby limiting the moving distance of the lock mounting piece 303 (refer to FIGS. 4B-4D).

The four filter fixing devices 270 are respectively positioned at the four corners of the filter fixing frame 280. By connecting each filter fixing device 270 with the lock hooks 241 of the filter fixing frame 280, the filter 190, the filter fixing devices 270 and the filter fixing frame 280 can connected together, so that the filter 190 can be fixed in the filtering section 162. This will be described in detail below in reference to FIGS. 4A-4D. Optionally, other numbers, such as two, three, five or even more, of filter fixing devices 270 may be used and the numbers are not limited to four as shown in the figures.

Figure 3A:
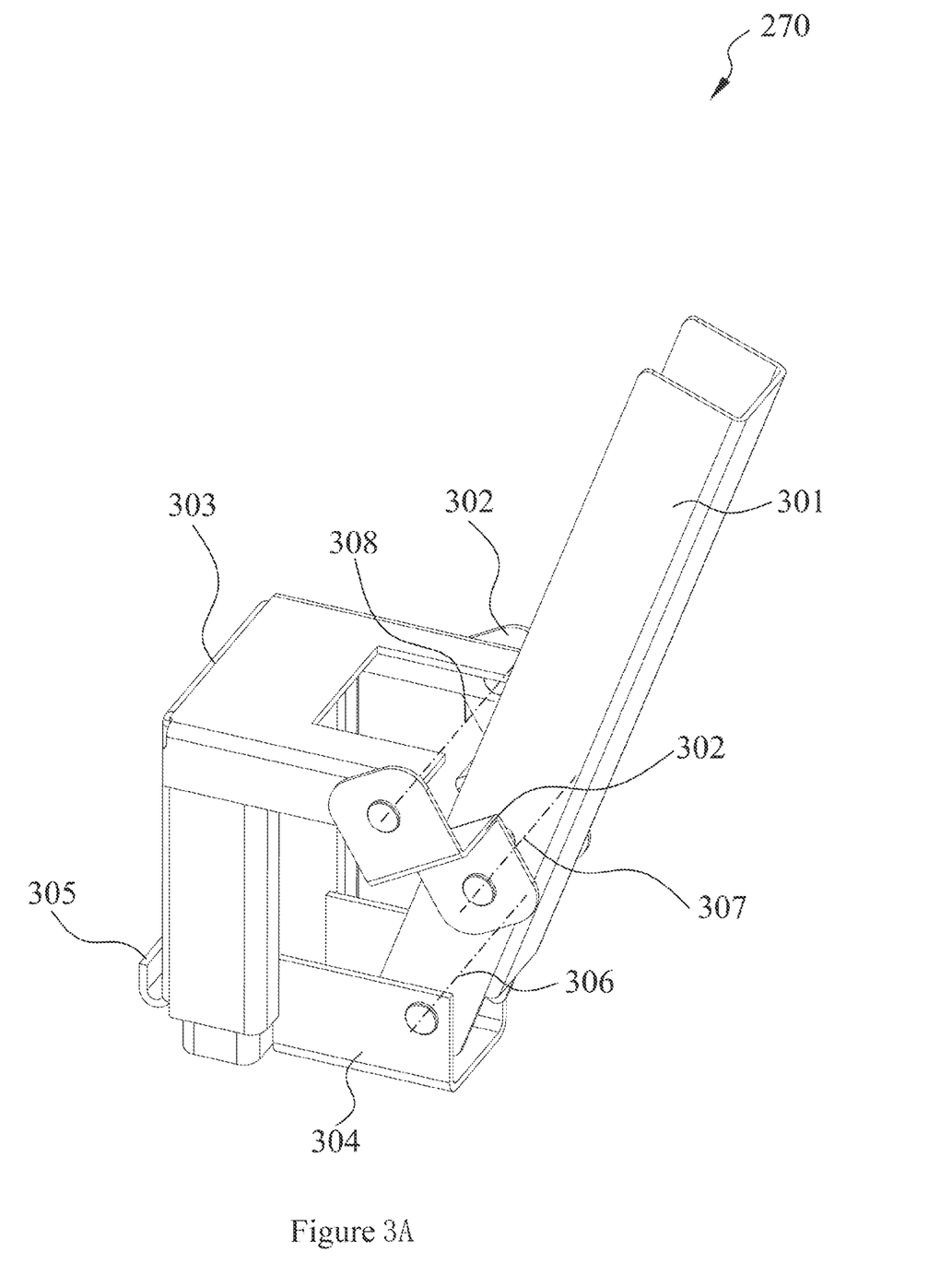
FIG. 3A is a perspective view of one embodiment of the filter fixing device 270 according to the present application.
Figure 3B:
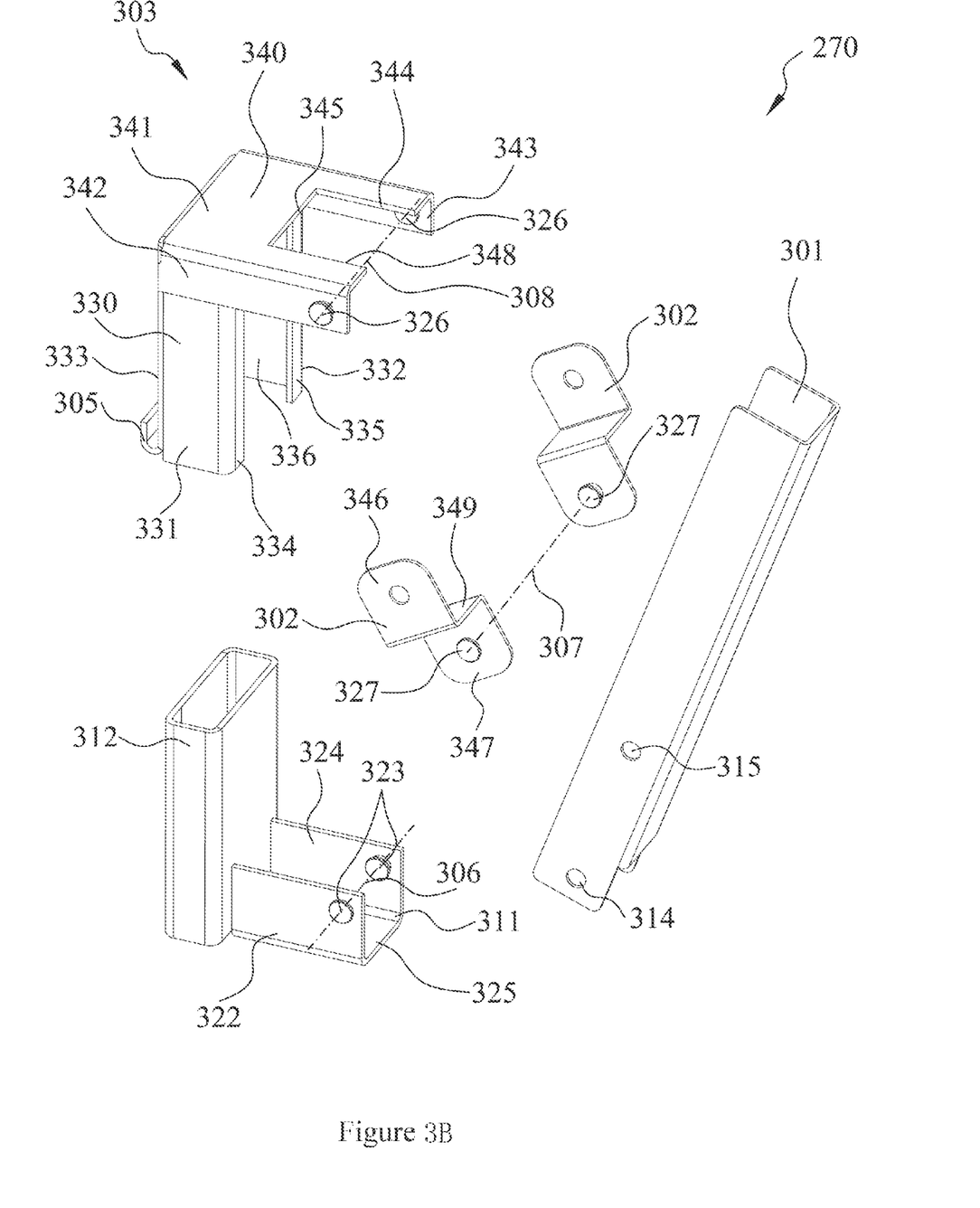
FIG. 3B is an explosive view of the perspective view of the filter fixing device 270 shown in FIG. 3A.

FIG. 3A is a perspective view of one embodiment of the filter fixing device 270, and FIG. 3B is an explosive view of the perspective view of the filter fixing device 270 shown in FIG. 3A, illustrating the specific structure of the filter fixing device 270. As shown in FIG. 3A, the filter fixing device 270 comprises a push rod 301, a connecting rod 302, a lock mounting piece 303, and a hold-down piece 304. Specifically, the hold-down piece 304 is positioned at the bottom of the filter fixing device 270 and is used to hold down the filter 190 from its top. The lock mounting piece 303 is sleeved on the hold-down piece 304, and can only move up and down (i.e., in the first direction) relative to the hold-down piece 304 but cannot move to the left or right (i.e., in the second direction). The bottom of the push rod 301 is pivotally connected to the right side of the hold-down piece 304, and the middle part of the push rod 301 is connected to the right side of the lock mounting piece 303 through the connecting rod 302. When the push rod 301 rotates relative to the hold-down piece 304, the push rod 301 drives the lock mounting piece 303, via the connecting rod 302, to move relative to the hold-down piece 304 to a certain position. At this point, the lock mounting piece 303 can be mated with the lock hook 241 of the filter fixing frame 280, and the filter 190 can be fixed between the hold-down piece 304 of the filter fixing devices 270 and the support plates 282 of the filter fixing frame 280.

With reference to FIGS. 3A and 3B, the hold-down piece 304 is approximately in an "L" shape and comprises a longitudinally positioned sliding block 312 and a horizontally positioned hold-down part 311, wherein the sliding block 312 is used to fit inside the lock mounting piece 303 and is connected to the lock mounting piece 303 in such a way that it can slide relative to the lock mounting piece. The hold-down part 311 is used to contact the filter 190 and hold down the filter 190. Specifically, the sliding block 312 is approximately in the shape of a hollow square, so as to reduce the weight of the hold-down piece 304 and save materials. The hold-down part 311 is fixedly connected to the lower end of the sliding block 312, the hold-down part 311 has a flat bottom 325 extending to the right, and supporting side walls 322 and 324 are provided on the front and rear sides of the flat bottom 325. Specifically, the lower surface of the flat bottom 325 is used to contact the filter 190, and the supporting side walls 322 and 324 are used to provide a pair of connecting pieces 323, and the push rod 301 can be pivotally connected to the two supporting side walls 322 and 324 of the hold-down piece 304 through the pair of connecting pieces 323. In the embodiment shown in FIGS. 3A and 3B, the supporting side walls 322 and 324 have the same length and are substantially parallel to each other, and the flat bottom 325 is connected at the bottom edge of the supporting side walls 322 and 324, so that the hold-down part 311 is approximately in a "U" shape. The pair of connecting pieces 323 are coaxial in the axis 306 and are coaxially positioned on the upper right part of the supporting side walls 322 and 324. Of course, in other embodiments, the connecting piece 323 may be provided as a connecting rod directly passing through the supporting side walls 322 and 324 instead of a pair of connecting pieces respectively provided on the supporting side walls 322 and 324.

The lock mounting piece 303 is approximately in the shape of an inverted "L", and comprises a connecting part for the hold-down piece 330 disposed longitudinally and a connecting part for the connecting rod 340 disposed transversely, wherein the connecting part for the hold-down piece 330 is used to fit with the sliding block 312 of the hold-down piece 304 and the connecting part for the connecting rod 340 is used to connect with the connecting rod 302. Specifically, the connecting part for the hold-down piece 330 has a structure of a hollow square, with the left edges of its front side wall 331 and its rear side wall 332 connected through the left side wall 333, and the right edges of the front side wall 331 and the rear side wall 332 both extending to form baffles 334 and 335, wherein the baffles 334 and 335 are spaced to have a certain distance between them. In this way, a longitudinally extending sliding slot 336 is formed between the left side wall 333, front side wall 331, rear side wall 332 and baffles 334 and 335 of the connecting part for the hold-down piece 330. The sliding slot 336 is used to sleeve on the sliding block 312 of the hold-down piece 304 and is movably connected to the sliding block 312. The inner contour of the sliding slot 336 matches the outer contour of the sliding block 312, or is slightly larger than the outer contour of the sliding block 312. The distance between the baffles 334 and 335 matches the distance between the supporting side walls 322 and 324 of the hold-down piece 304, or is slightly larger than the distance between the supporting side walls 322 and 324. In this way, the sliding block 312 can be at least partially accommodated in the sliding slot 336, and can move up and down relative to the sliding slot 336. The relative movement between the sliding block 312 and the sliding slot 336 can cause the lock mounting piece 303 and the hold-down piece 304 to move up and down relative to each other.

A lock 305 is also provided on the outside of the left side wall 333 of the connecting part for the hold-down piece 330. In the present embodiment, the lock hook 305 is the lock hook 305 formed by extending of the left side wall 333 of the connecting part for the hold-down piece 330 from the bottom to the top. The lock hook 305 is used to engage and connect with the lock hook 241 on the filter fixing frame 280, so that the filter fixing device 270 and the filter fixing frame 280 are connected. In this embodiment, the lock hook 305 is positioned at the bottom of the left side wall 333. Optionally, the lock hook 305 may also be provided on the front side wall 331 or the rear side wall 332, or on the connecting part for the connecting rod 340, as long as the lock hook 241 on the filter fixing frame 280 is positioned accordingly. And optionally, other structures may also be used for the lock and the lock receiving part to limit the relative movement between the hold-down piece 304 and the lock mounting piece 303 up and down. For example, the lock may be a wall extending to the left and perpendicular to the lock mounting piece 303, and the lock receiving part may be a wall extending to the right and perpendicular to the filter fixing frame 280.

The connecting part for the connecting rod 340 is positioned on the top of the connecting part for the hold-down piece 330 and extends to the right. The top 341 of the connecting part for the connecting rod 340 is provided with a push rod receiving part 344 and a push rod limiting part 345, wherein the push rod receiving part 344 is used to accommodate the push rod 301, and the push rod limiting part 345 is used to restrict the rotation of the push rod 301. As an example, the push rod receiving part 344 is a groove 348 extending leftward from the right edge of the top 341 of the connecting part for the connecting rod 340, and the bottom of the groove 348 forms a push rod limiting part 345. The groove 348 is used to accommodate or receive the push rod 301 when the push rod 301 rotates counter-clockwise, and the push rod 301 cannot continue to rotate when the push rod 301 rotates counter-clockwise to a point where it abuts against the push rod limiting part 345. As an example, the width of the groove 348 matches the width of the push rod 301. In other embodiments, the width of the groove 348 may also be greater than the width of the push rod 301, or the push rod limiting part 345 is provided on the connecting part for the hold-down piece 330, as long as the rotation of the push rod 301 can be restricted at an appropriate point. In the embodiment shown in the figures, supporting side walls 342 and 343 are provided on the front and rear sides of the top 341 of the connecting part for the connecting rod 340, and the supporting side walls 342 and 343 are used to provide a pair of connecting pieces 326. Wherein, the pair of connecting pieces 326 and the connecting part for the hold-down piece 330 are spaced to have a certain distance between them in the horizontal direction (i.e., the second direction). The connecting rod 302 can be pivotally connected, via the pair of connecting pieces 326, to the two supporting side walls 342 and 343 of the connecting part for the connecting rod 340. Similar to the pair of connecting pieces 323, the pair of connecting pieces 326 are also coaxial and are coaxial in the axis 308. In the embodiment shown in the figures, the distance between the supporting side walls 342 and 343 is greater than the width of the groove 348, i.e., greater than the width of the push rod 301. Optionally, the connecting part for the connecting rod 340 may also extend to the right at an upward or downward angle.

The push rod 301 is in the shape of a long square tube, and the width of the push rod 301 (i.e., the distance between the front and rear sides of the push rod 301) is approximately the same as that between the supporting side walls 322 and 324 of the hold-down part 311, so that the push rod 301 can be connected to the hold-down part 311 between the supporting side walls 322 and 324. Two sets of connecting holes 314 and 315 are provided at a distance along the length of the push rod 301, wherein the connecting hole 314 comprises a pair of connecting holes 314, provided at the bottom of the push rod 301 for connecting with the pair of connecting pieces 323 on the hold-down part 311 of the hold-down piece 304. Since the pair of connecting pieces 323 are coaxial in the axis 306, the push rod 301 can rotate around the axis 306 relative to the hold-down piece 304. The connecting hole 315 also comprises a pair of connecting holes 315, positioned in the middle of the push rod 301, and the connecting holes 315 are also spaced at a certain distance from the connecting hole 314 in the vertical direction (i.e., the up and down direction). The pair of connecting holes 315 and the connecting rod 302 are connected by a pair of coaxially arranged connecting pieces 327. Since the pair of connecting pieces 327 are coaxial in the axis 307, the push rod 302 can rotate around the axis 307 relative to the hold-down piece 301.

Two connecting rods 302 are symmetrically positioned on the front and rear sides of the connecting part for the connecting rod 340 and the push rod 301, and each of the connecting rods 302 has a left end 346 and a right end 347. The left end 346 of each of the connecting rods 302 is connected to the connecting part for the connecting rod 340 through a connecting piece 326, and the right end 347 of each of the connecting rods 302 is connected to the push rod 301 through a connecting piece 327. Since the distance between the supporting side walls 342 and 343 of the lock mounting piece 303 is greater than the width of the push rod 301, the left end 346 and the right end 347 of each of the connecting rods 302 are not on the same plane, and the distance between left ends 346 of the two connecting rods 302 is greater than that between the right ends 347. The left end 346 and the right end 347 of each of the connecting rods are connected to each other through a transverse connecting surface 349, so that the connecting rods 302 are approximately in a "Z" shape.

The various components and connections of the filter fixing device 270 are described in detail above, but those skilled in the art should know that the various components and connections of the filter fixing device 270 are not limited to the above. For example, the push rod 301 may be a cylindrical tube, and the lock mounting piece 303 and the hold-down piece 304 may be in other structures such as sleeves to achieve their relative movement in the vertical direction.

FIGS. 4A-4D illustrate the process 400 whereby the filter 190 is mounted through the filter fixing device 270 as shown in FIG. 2 on the filter fixing frame 280, and show the process of mounting the filter 190 and how the push rod 301, the hold-down piece 304, the connecting rod 302 and the lock mounting piece 303 are connected. For ease of description, only one filter fixing device 270 is taken as an example to illustrate the mounting process of the filter 190.

Figure 4A:
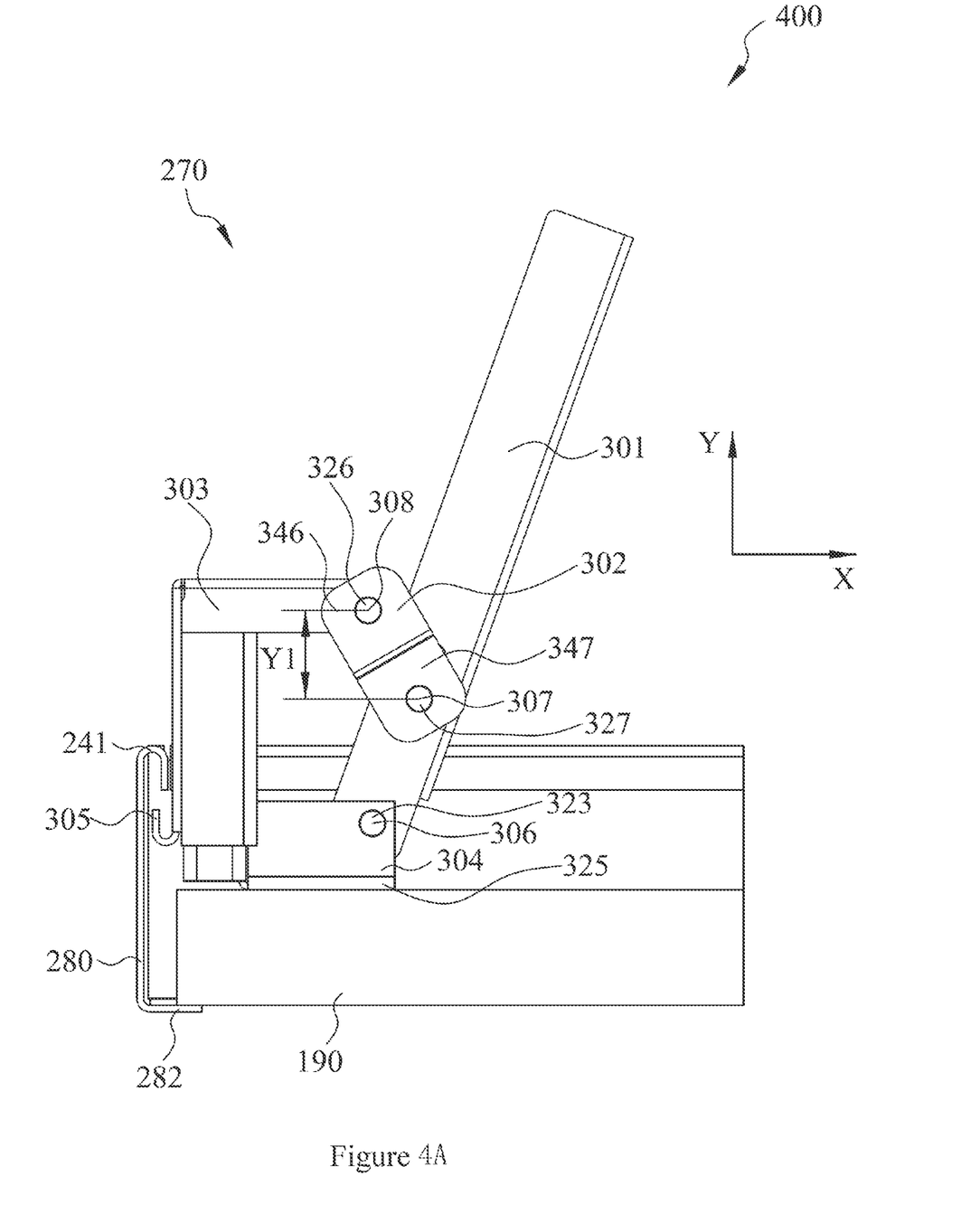
FIGS. 4A-4D illustrate the process 400 whereby the filter 190 is mounted through the filter fixing device 270 as shown in FIG. 3A to the filter fixing frame 280 as shown in FIG. 2.

As shown in FIG. 4A, the operator firstly puts the filter 190 into the filter fixing frame 280, and then places the filter fixing device 270 on the filter 190. The lower surface of the filter 190 is supported on the support plate 282 of the filter fixing frame 280, and the upper surface of the filter 190 is in contact with the flat bottom 325 of the hold-down piece 304 of the filter fixing device 270. In this way, the lock mounting piece 303 of the filter fixing device 270 is at the lowest position relative to the hold-down piece 304, the lock hook 305 is located below the lock hook 241 of the filter fixing frame 280, and the ends of the lock hooks are spaced with a certain distance between them. In this way, the connecting piece 326 (the connection point between the connecting rod 302 and the connecting part for the connecting rod 340, or the first connection point of the connecting rod) is located at the upper left side of the connecting piece 327 (the connection point between the push rod 301 and the connecting rod 302, or the second connection point), so that the connecting rod 302 is inclined to the lower right from its left end 346 to its right end 347 and is positioned at an obtuse angle to the positive direction of the X axis. In addition, the connecting piece 327 is located to the upper right side of the connecting piece 323 (i.e., the connection point between the push rod 301 and the hold-down piece 304). The push rod 301 is at its rightmost position and is positioned at an acute angle to the positive direction of the X axis. The distance between the first connection point of the connecting rod and the second connection point of the connecting rod has a component distance Y1 on the Y axis. As will be explained in detail below, a change in the Y axis component of the distance between the first connection point and the second connection point of the connecting rod reflects the distance of up-down movement of the lock mounting piece 303 relative to the hold-down piece 304.

The operator pushes the push rod 301 to the left. Since the lock hook 305 and the lock hook 241 are spaced at a certain distance from each other at this point, only a small amount of force is required to make the push rod 301 rotate counter-clockwise around the axis 306. As the push rod 301 rotates counter-clockwise, on the one hand, the right end 347 of the connecting rod 302 rotates clockwise relative to the push rod 301 along the axis 307, and on the other hand, its left end 346 rotates clockwise relative to the lock mounting piece 303 along the axis 308. This means the acute angle between the connecting rod 302 and the positive direction of the X axis gradually decreases, while the component Y2 on the Y axis of the distance between the first connection point of the connecting rod and the second connection point of the connecting rod increases. As a result, the lock mounting piece 303 can be moved a certain distance upward relative to the hold-down piece 304 before it reaches the point shown in FIG. 4B, and this distance is equal to the difference between the components Y2 and Y1.

Figure 4B:
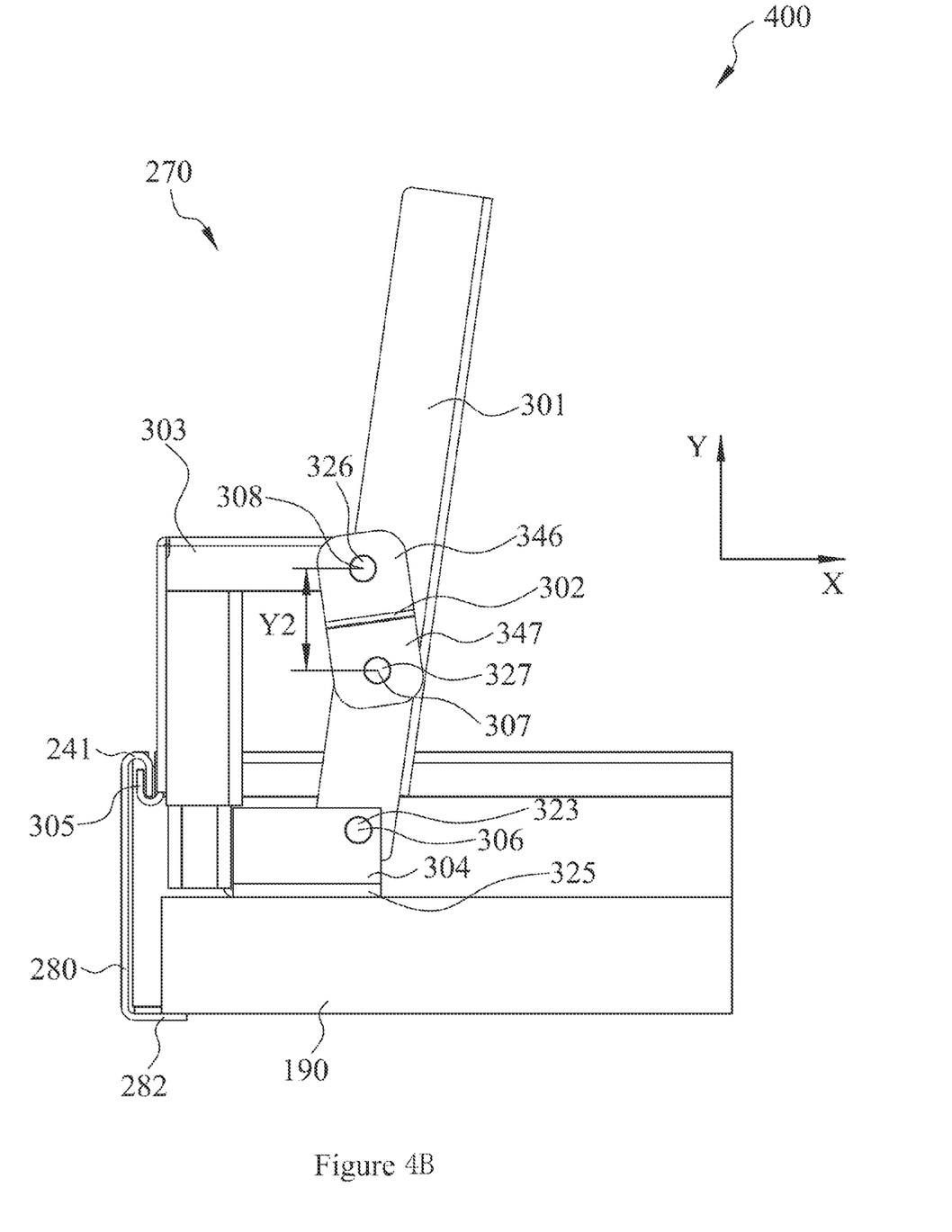

At this point, the lock hook 305 also moves up until it just hooks to the lock hook 241 but the two hooks are not pulled against each other so there is no tension between them. The first connection point of the connecting rod is still located to the upper left side of the first connection point of the connecting rod and is still located to the upper right side of the connection point between the push rod 301 and the hold-down piece 304. And at this point, the obtuse angle between the connecting rod 302 and the positive direction of the X axis is close to 90°, and the acute angle between the push rod 301 and the positive direction of the X axis is also close to 90°.

When the operator continues to push the push rod 301 to the left, since the lock hook 305 of the lock mounting piece 303 and the lock hook 241 of the filter fixing frame 280 are hooked to each other in the state shown in FIG. 4B, the lock mounting piece 303 cannot continue to move up along the Y axis. The operator needs to apply more force to make the push rod 301 continue to move. The force applied on the push rod 301 creates a tension between the lock hook 305 and the lock hook 241, which results in slight deformation of the lock hook 305 and the lock hook 241. And, because the lock mounting piece 303 cannot continue to move upward along the Y axis, it exerts a downward force on the left end 346 of the connecting rod 302 along the Y axis, and the push rod 301 exerts an oblique upward force on the right end 347 of the connecting rod 302. Under the above two forces, the connecting rod 302 will also be slightly deformed. The deformation of the lock hook 241 of the lock hook 305 and/or that of the connecting rod 302 allows the push rod 301 to continue to move to the left. Overall, as the push rod 301 continues to rotate counter-clockwise around the axis, the right end 347 of the connecting rod 302 continues to rotate clockwise relative to the push rod 301 along the axis 307, and its left end 346 continues to rotate clockwise relative to the lock mounting piece 303 along the axis 308. Under the reacting force, the lock mounting piece 303 exerts a downward reaction force on the push rod 301 through the connecting rod 302, and this force is transmitted to the hold-down piece 304, causing the hold-down piece 304 to apply a pressing force on the filter 190 so that the filter 190 is compressed inside the filter fixing frame 280. That is, after the state shown in FIG. 4B, a greater force needs to be applied to continue pushing the push rod 301 to the left, but there is no relative movement but a compression between the lock hook 305 and the lock hook 241.

Figure 4C:
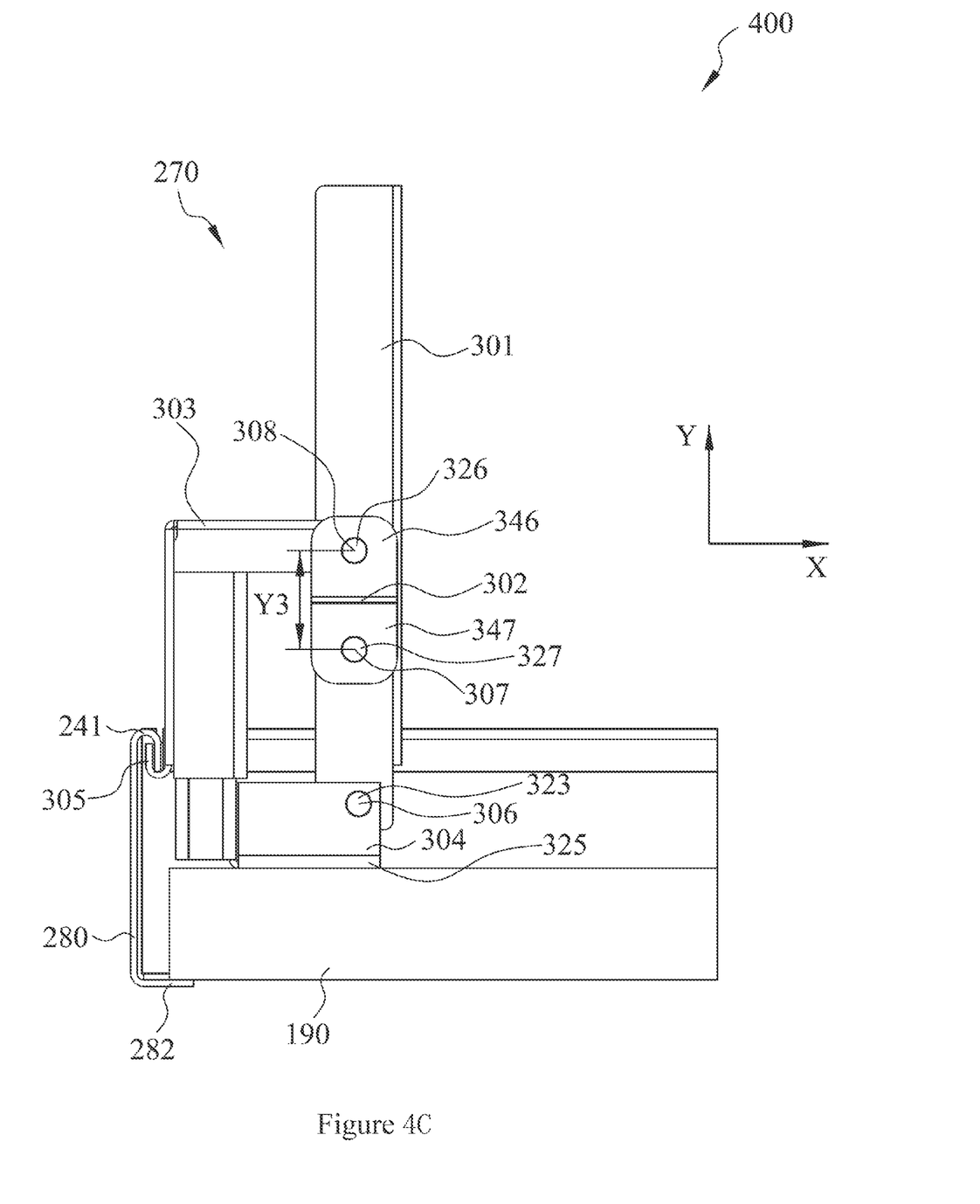

When the push rod 301 is further pushed to reach the state shown in FIG. 4C, the push rod 301 and the connecting rod 302 are both in a vertically upright position, i.e., 90° to the positive direction of the X axis. The compression between the lock hook 305 and the lock hook 241 reaches the maximum, and the pressing force that the filter fixing device 270 applies on the filter 190 also reaches the maximum. And, at this point, the first connection point of the connecting rod is located right above the second connection point of the connecting rod, and the difference between the distance between them, i.e., their distance Y3 on the Y axis, and the difference between the Y3 and Y1 is equal to the difference between components Y2 and Y1.

Figure 4D:
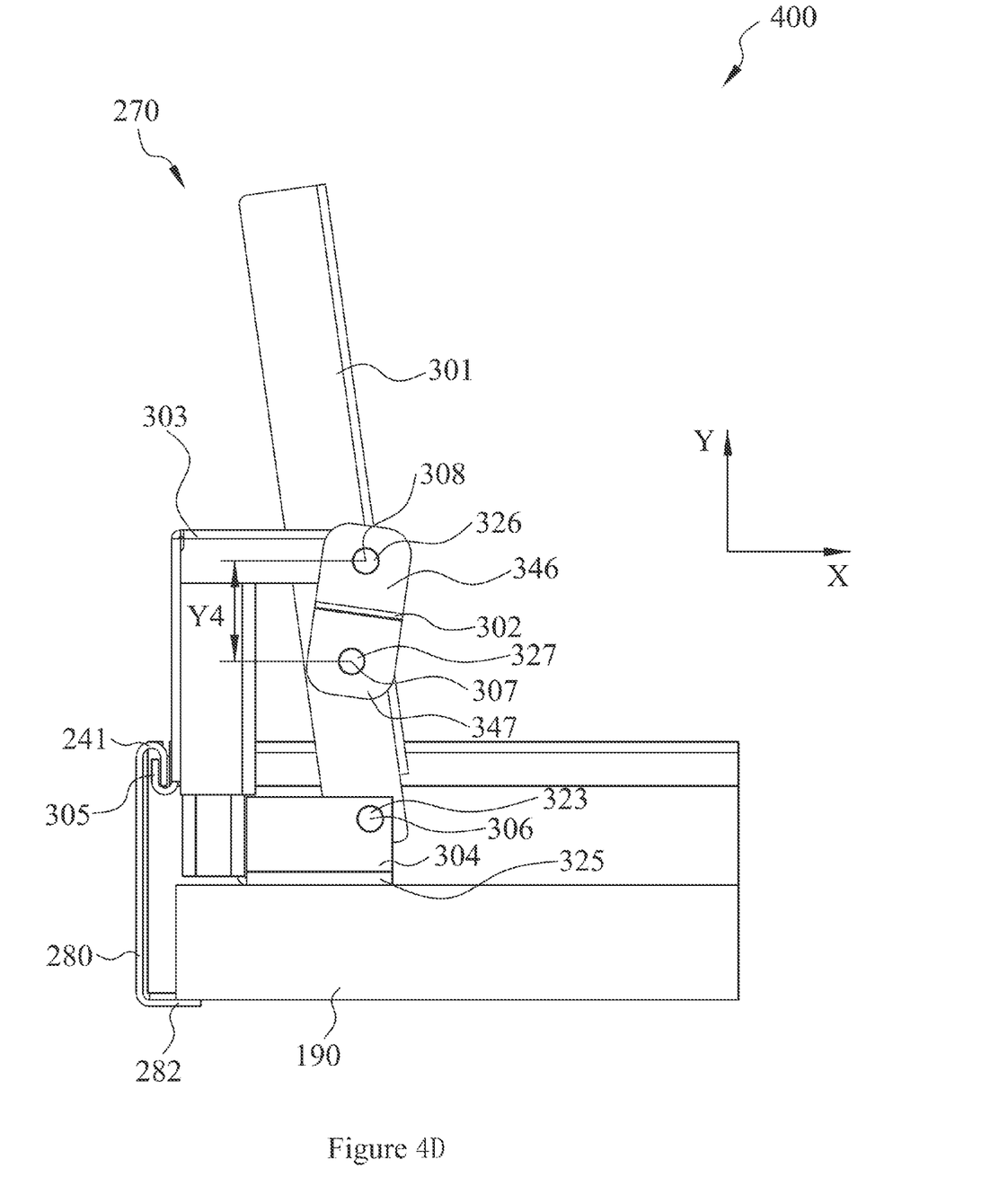

When the operator continues to push the push rod 301 to the left, the push rod 301 goes into the groove 348 of the push rod receiving part 344. The right end 347 of the connecting rod 302 continues to rotate clockwise relative to the push rod 301 along the axis 307, and its left end 346 continues to rotate clockwise relative to the lock mounting piece 303 along the axis 308. When the push rod 301 abuts against the push rod limiting part 345 (refer to the push rod limiting part 345 in FIG. 3B), the push rod 301 cannot continue to rotate, and it reaches the position shown in FIG. 4D. As shown in FIG. 4D, the first connection point of the connecting rod is located to the upper right side of the second connection point of the connecting rod, so that the connecting rod 302 is inclined to the lower left from the left end 346 to the right end 347 and is positioned at an obtuse angle to the positive direction of the X axis. And, the second connection point of the connecting rod is located to the upper left side of the connection point between the push rod 301 and the hold-down piece 304. The push rod 301 is at its leftmost position and is positioned at an obtuse angle to the positive direction of the X axis. The distance between the first connection point of the connecting rod and the second connection point of the connecting rod has a component distance Y4 on the Y axis. Similarly, the difference between the components Y4 and Y1 is equal to the difference between Y3 and Y1.

At this point, the compression between the lock hook 305 and the lock hook 241 is slightly reduced, but there is still sufficient tension between them so that the filter fixing device 270 can tightly press the filter 190 inside the filter fixing frame 280. And, at this point, the push rod 301 is under a force that is toward its diagonally lower left and is received from the connecting rod 302 through the connecting piece 327, and is also under a force along the positive direction of the X axis received from the push rod limiting part 345 and a force along the positive direction of the Y axis received from the hold-down piece 304 through the connecting piece 323. The above three forces always reach an equilibrium so that the filter fixing device 270 is self-locked.

To remove the filter 190, operate in the reverse direction of the above process by pushing the push rod 301 to the right so that the angle between the push rod 301 and the positive direction of the X axis is less than 90°, and the filter fixing device 270 can be removed. Optionally, the connection point between the push rod 301 and the connecting rod 302 (the second connection point of the connecting rod) may be positioned at the connection point between the connecting rod 302 and the connecting part for the connecting rod 340 of the lock mounting piece 303 (the first connection point of the connecting rod). In this case, pushing the push rod 301 to the right will press the filter 290, and pushing the push rod 301 to the left will release the filter 290.

The filter fixing device 270 of the present application uses the connecting rod 302 to convert the rotation of the push rod 301 into the up-down movement of the lock mounting piece 303, and then presses the filter 190 into the filter fixing frame 280 through the lock hook 305 of the lock mounting member 303 and the lock hook 241 of the filter fixing frame 280. In this application, the push rod limiting part 345 is provided to restrict the rotation of the push rod 301 to form a self-locking structure that ensures the stability of the filter fixing device 270 and has no impact on the sealing of the filter 190 due to reduced compression arising from air flow or vibration of the air conditioning unit during operation.

Although the present application is described with reference to the specific embodiments shown in the figures, it should be understood that the filter fixing device of the present application can have many variations without departing from the motivation, scope and background of the present application. Those skilled in the art will also realize that various ways of changing structural details in the embodiments disclosed in the present application fall within the spirit and scope of the present application and claims.

The invention claimed is:

1. A filter fixing device, characterized in that: said filter fixing device comprises:
   a lock mounting piece, wherein the lock mounting piece is provided with a lock, and the lock is used to engage a lock receiving piece on a filter fixing frame;
   a hold-down piece, wherein the hold-down piece and the lock mounting piece are connected to each other in such a way that they may move relative to each other in a first direction, and the hold-down piece is used to hold down a filter;
   a push rod, wherein the push rod is connected to the hold-down piece in such a way that the push rod can pivotally rotate around an axis; and
   at least one connecting rod, wherein the at least one connecting rod is pivotally connected to the push rod and the lock mounting piece;
   wherein, the filter fixing device is configured in such a way that rotation of the push rod relative to the hold-down piece may cause relative motion of the hold-down piece and the lock mounting piece in the first direction.

2. The filter fixing device as claimed in claim 1, characterized in that:
   the lock mounting piece comprises a first connecting part for the hold-down piece, wherein the first connecting part for the hold-down piece is provided with a sliding slot positioned along the first direction, the hold-down piece is provided with a sliding block positioned along the first direction, and the lock mounting piece and the hold-down piece can move relative to each other through the sliding slot and the sliding block.

3. The filter fixing device as claimed in claim 2, characterized in that:
   the lock mounting piece comprises a second connecting part for the at lease one connecting rod, wherein the second connecting part for the at least one connecting rod is positioned along a second direction and fixedly connected to the first connecting part for the hold-down piece, and the at least one connecting rod is pivotally connected to the second connecting part for the at least one connecting rod, wherein the second direction intersects with the first direction.

4. The filter fixing device according to claim 3, characterized in that:

the second connecting part for the at least one connecting rod comprises a push rod receiving part and a push rod limiting part, wherein the push rod receiving part is used to receive the push rod and the push rod limiting part is used to limit the rotation of the push rod relative to the hold-down piece.

5. The filter fixing device as claimed in claim 3, characterized in that:

a connection point between the at least one connecting rod and the second connecting part for the at least one connecting rod is a first connection point of the at least one connecting rod, which is spaced at a first certain distance from the first connecting part for the hold-down piece;

an additional connection point between the at least one connecting rod and the push rod is a second connection point of the at least one connecting rod, which is spaced at a second certain distance from the axis.

6. The filter fixing device as claimed in claim 2, characterized in that:

the hold-down piece comprises a hold-down part, wherein the hold-down part is positioned perpendicular to the first direction, the hold-down part is fixedly connected to the sliding block, and the push rod is pivotally connected to the hold-down part.

7. The filter fixing device as claimed in claim 1, characterized in that:

two connecting rods are provided as the at least one connecting rod, wherein the at least one connecting rod is symmetrically connected to two sides of the push rod.

8. A filter fixing structure, characterized in that: said filter fixing structure comprises:

a filter fixing device as claimed in any of claims 1-7; and a filter fixing frame, wherein the filter fixing frame is provided with a lock receiving part, the locking receiving part can be connected to or separated from the lock of the filter fixing device to detachably fix the filter in the filter fixing frame.

9. The filter fixing structure as claimed in claim 8, characterized in that:

the lock and the lock receiving part are both lock hooks.

10. An air conditioning unit, characterized in that: the air conditioning unit comprises:

a filter fixing structure as claimed in claim 8; and a filter;

wherein, the filter can be pressed in the filter fixing frame by the hold-down piece of the filter fixing device, so as to be detachably fixed by the filter fixing device in the filter fixing frame.

\* \* \* \* \*